Patented June 24, 1930

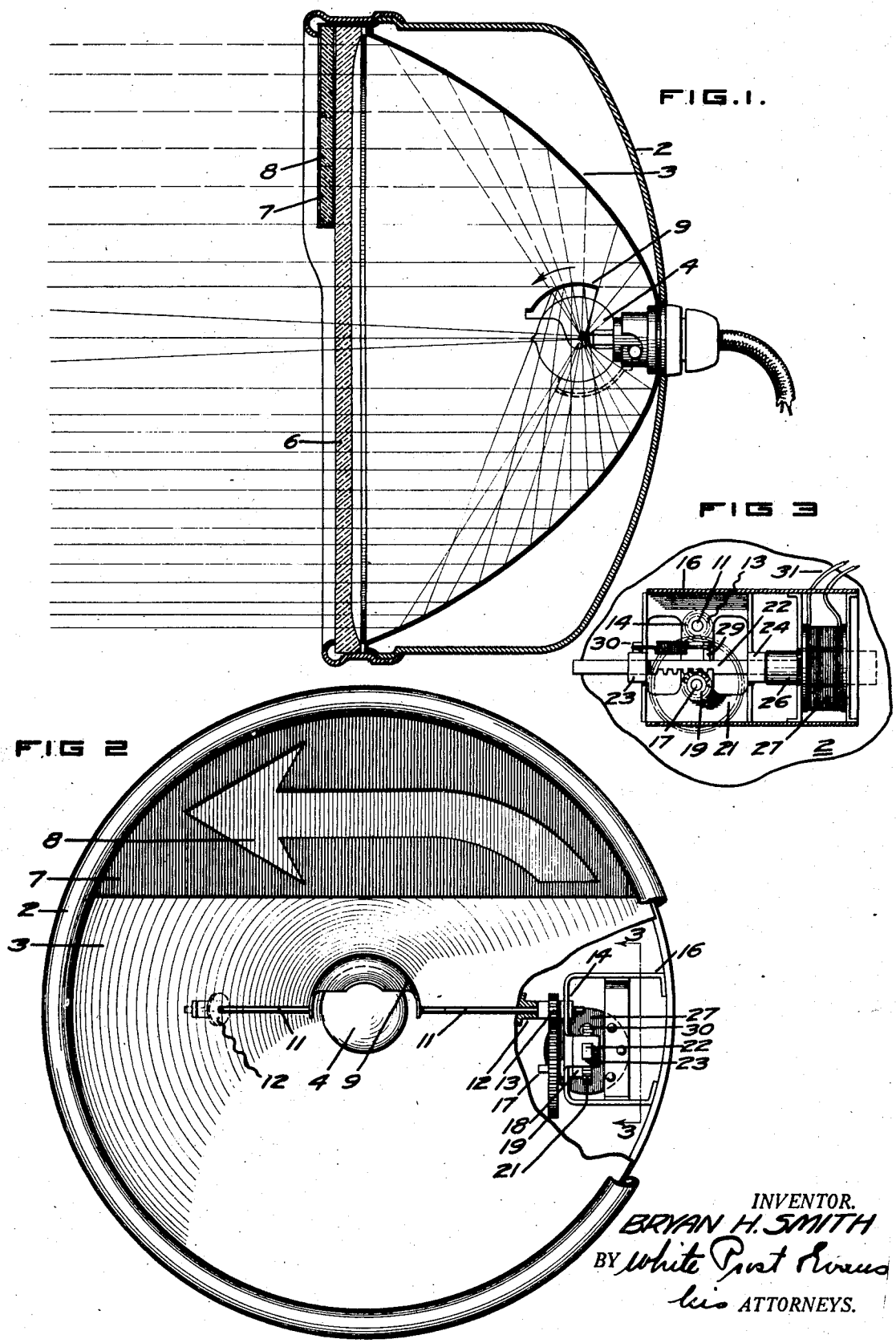

1,766,199

UNITED STATES PATENT OFFICE

BRYAN H. SMITH, OF BERKELEY, CALIFORNIA

DIRECTION INDICATOR

Application filed January 8, 1923. Serial No. 611,466.

My invention relates to direction indicators and more particularly to means whereby the operator of a motor vehicle may indicate to pedestrians and approaching vehicles his intention to turn.

One of the objects of my invention is to provide an illuminated signal and means for its operation that may be readily arranged on the head or rear lamps of a vehicle.

Another object is to provide a signal visible to approaching vehicles operable in conjunction with the rear signal of a motor vehicle.

Another object is to provide illuminated signals arranged on the headlights of a vehicle, which when in operation divert the projected rays of light through the signal indicia, thereby lessening the headlight glare and making the signal clearly visible.

Still another object is to provide a signal of the character described that requires but little power to operate and only during the signaling period.

The invention possesses other advantageous features, some of which, with the foregoing, will be set forth at length in the following description where I shall outline in full that form of the invention which I have selected for illustration in the drawings accompanying and forming a part of the present specification. Although in the drawings I have shown but one embodiment of my invention, I do not desire to be limited thereto, since the invention as expressed in the claims may be embodied in other forms also.

Referring to the drawings:

Figure 1 is a vertical section of a headlight equipped with my signal means;

Fig. 2 is a front elevation of the headlight equipped with my signal means, a portion of the reflector being broken away to disclose its operating mechanism.

Fig. 3 is a section taken on line 3—3 of Fig. 2 further illustrating the operating mechanism.

Direction signals adapted for operation on the front of a motor vehicle and provided to warn pedestrians and approaching vehicles, have heretofore proven unsightly and difficult to see due to the headlight glare of the signaling vehicle. I have therefore arranged indicia on the headlights of a vehicle and provide means for deflecting the projected light rays therethrough when desiring to turn, thus diverting the reflected light and making the signal readily visible.

My invention is applicable to any conventional type of headlight which usually comprises a casing 2 a reflector 3 arranged within the casing, a lamp 4 arranged at or adjacent the focus of the reflector and a lens 6 disposed in front of the reflector. In accordance with my invention, the signal is associated with the headlight and usually comprises a segmental plate 7 of translucent material, preferably colored glass, having indicia 8 thereon. The plate is arranged so that it will be illuminated by light emanating from the lamp 4 and is usually disposed at the upper portion of the lens. Instead of being formed as a separate element, the plate may be integral with the lens and formed of a different colored glass, usually red, although the signal plate on one headlight may be red and on the other headlight green.

Normally the light emanating from the lamp 4 is controlled so that the major portion of it passes through the lens below the signaling plate so that good driving light is provided and so that the signal is not visible to the driver of an approaching vehicle. When it is proposed to turn the vehicle from its course, the signal associated with the headlight on that side of the vehicle toward which it is to be turned, is operated to cause a larger portion of the light to be directed through the signal plate, thus illuminating the signal plate and dimming the headlight, so that the signal will be clearly visible to an approaching driver. By simultaneously dimming the headlight and displaying the signal, a compelling effective signal is provided which calls the attention of the approaching driver to the intent of the driver of the vehicle. Means are provided for diverting the light from the lens to the signal plate and vice versa, this means in the present construction comprising a movable shield arranged adjacent the lamp, which shield may have a diffusing or a reflecting surface. When a reflecting surface is used, such surface is preferably substantially concentric with the source of light so that the reflected light is directed back to the main reflector and is thence reflected through the lens or the signal plate, depending upon the position of the shield. This will insure an efficient driving light at all times.

Arranged adjacent the lamp 4 is a substantially lune-shaped shield 9 supported on rods 11. The rods project through apertures in the reflector 3 and are rotatably arranged in bearings 12 suitably secured to the back thereof. The shield 9 is adapted to divert reflected or directly projected light rays, either through the indicia and from the roadway or vice versa.

The normal position of the shield is shown in full lines in the drawings and the signaling position in dotted lines in Fig. 1.

The utility of a device of this character depends largely on its simplicity and low power consumption. I have therefore provided a mechanism illustrated in Figs. 2 and 3 which requires but a small amount of electric current and that, only during the signaling period. While I have made no showing of a switch mechanism for controlling the current, I wish it understood the device will preferably be actuated by an automatic switch of my invention shown in my co-pending application Serial No. 596,430 entitled Indicator and in conjunction with the rear direction signal shown in said application.

Keyed to one end of the shaft 11 is a small gear 13 positioned between the bearing 12 and a bearing 14 formed on a bracket 16. The bracket is secured to the inside of the headlight housing 2 and provides support for the entire operating mechanism. Positioned below the shaft 11 in a bearing 18 is a short shaft 17 on which gears 19 and 21 are arranged. The gear 19 is adapted to mesh with the gear 13 secured to shaft 11 and the gear 21 meshes with a rack 22 slidably supported in bearings 23 and 24. One end of the rack is secured to a solenoid core 26 longitudinally movable through the bore of a coil 27, the rack and core normally being held in the full line position shown by a tension spring interposed between a pin 29 on the rack and a pin 30 secured to the rack bearing 23. In the position shown the rack bearing 24 acts as a limit stop for the solenoid core 26 which is partially retracted from the bore in the coil 27, and the shield 9 is in normal position.

When it is desired to signal an intended turn, the solenoid coil is energized through the wires 31, retracting the core and rack to the dotted line position shown, against the tension of the spring 28. This movement is transmitted through the gear train and rod 11 to the shield, rotating it in the direction of the arrow to the dotted line position shown. In this position some of the light rays that illuminated the roadway are now deflected and the indicia brightly illuminated.

While I have shown but one headlight equipped with my device it is to be understood that the usual practice will be to equip both lights. The indicia will then be so arranged that the left lamp indicates a left turn and vice versa, also that though I prefer to use my device with my first mentioned actuating mechanism which is the subject of a co-pending application, any other suitable switch mechanism may be employed.

I claim:

1. The combination with an automobile headlight having a source of light, of a lens having a signaling area and a road lighting area, and means for alternately directing light from the source to the respective areas.

2. The combination with an automobile headlight having a source of light, of a lens having a signaling area and a road lighting area, and a movable shield for controlling the relative amount of light directed toward the respective areas.

3. The combination with an automobile headlight having a reflector, a lens, and a source of light, of a signal plate occupying a portion of the area in front of the reflector, a movable shield positioned adjacent to and shielding a substantially constant portion of said source of light from said reflector, and means for moving said shield about said light source between two extreme shielding positions.

4. A direction indicator of the class described comprising a reflector; a lens in front of said reflector; an indicium superposed on a portion of said lens; a light source operatively positioned with respect to said reflector, said lens, and said indicium; a reflecting shield positioned adjacent to and shielding a portion of said light source from said reflector; and means for moving said shield about said light source to divert light from said source and said reflector alternately through said lens or said indicium.

In testimony whereof, I have hereunto set my hand.

BRYAN H. SMITH.